United States Patent [19]

Taniguchi et al.

[11] Patent Number: 5,160,041
[45] Date of Patent: Nov. 3, 1992

[54] COAGULATION REACTION TANK

[75] Inventors: Naohiro Taniguchi, Yokohama; Syuzo Koike, Urawa; Yasuhiko Watanabe, Tokyo; Tadao Takeuchi, Tokyo; Noboru Fujiwara, Tokyo, all of Japan

[73] Assignees: Japan Sewage Works Agency, Tokyo, Japan; Kurita Water Industries Ltd., Tokyo, Japan

[21] Appl. No.: 858,438

[22] Filed: Mar. 24, 1992

Related U.S. Application Data

[63] Continuation of Ser. No. 702,290, May 20, 1991, abandoned, which is a continuation of Ser. No. 499,345, filed as PCT/JP88/01321, Dec. 23, 1988, Pat. No. 5,069,784.

[30] Foreign Application Priority Data

Dec. 25, 1987 [JP] Japan ................. 62-327190

[51] Int. Cl.$^5$ ............... C02F 1/52; B01D 29/075
[52] U.S. Cl. ..................... 210/205; 210/219; 210/260; 210/415; 366/325
[58] Field of Search ............... 210/205, 219, 220, 256, 210/260, 261, 413, 414, 415, 433.1; 366/279, 293, 307, 325

[56] References Cited

U.S. PATENT DOCUMENTS

| | | | |
|---|---|---|---|
| 1,639,590 | 8/1927 | Cockran | 210/414 |
| 1,687,428 | 10/1928 | Cockran | 210/415 |
| 2,181,404 | 11/1939 | Kopitz et al. | 210/415 |
| 2,404,215 | 7/1946 | Cavanaugh | 210/415 |
| 2,594,785 | 4/1952 | Meeker | 210/415 |
| 4,159,841 | 8/1979 | Chupka et al. | 210/415 |
| 4,931,180 | 6/1990 | Darchambeau | 210/414 |

FOREIGN PATENT DOCUMENTS

| | | |
|---|---|---|
| 52-77461 | 6/1977 | Japan . |
| 61-810 | 1/1986 | Japan . |
| 61-118102 | 7/1986 | Japan . |
| 62-48405 | 3/1987 | Japan . |

Primary Examiner—Stanley S. Silverman
Assistant Examiner—Christopher Upton
Attorney, Agent, or Firm—Oblon, Spivak, McClelland, Maier & Neustadt

[57] ABSTRACT

A coagulation reaction tank comprises a cylindrical tank provided in the central part thereof with a rotary stirring mechanism furnished with stirring vanes and a filtration tank for introducing the liquid from within the cylindrical tank in the form of filtrate and discharging the filtrate out of the cylindrical tank. This coagulation reaction tank is characterized by the fact that the filtration tank provided in the bottom thereof with slits is disposed in the cylindrical tank above the stirring vanes or the cylindrical tank provided in the upper part of the wall thereof with slits and the filtration tank is disposed outside the slits.

1 Claim, 4 Drawing Sheets 5,160,041

COAGULATION REACTION TANK

This application is a continuation of application Ser. No. 07/702,290, filed on May 20, 1991, now abandoned, which is a continuation of Ser. No. 07/499,345, filed as PCT/JP88/01321, Dec. 23, 1988, now U.S. Pat. No. 5,069,784.

TECHNICAL FIELD

This invention relates to a coagulation reaction tank which, by stirring sludge supplied thereto in combination with a coagulant by the use of rotary stirring means provided with stirring vanes, produces floc possessing ample strength even when the sludge is supplied in a low concentration.

BACKGROUND ART

As a coagulation reaction tank of this class, Japanese Utility Model Public Disclosure SHO 62(1987)-48405 discloses one comprising a cylindrical tank, rotary stirring means disposed upright in the central part of the cylindrical tank, provided with stirring vanes, and adapted to stir sludge supplied thereto with a coagulant and convert the sludge into floc, and a filtration tank disposed concentrically in the upper internal part of above the cylindrical tank and adapted to draw in through the bottom thereof the liquid from within the cylindrical tank in the form of filtrate and discharge the filtrate out of the cylindrical tank (first conventional technique). Japanese Utility Model Public Disclosure SHO 62(1987)-118602 discloses a coagulation reaction tank which comprises a cylindrical tank and a filtration tank disposed concentrically in the upper internal part of the cylindrical tank and adapted to draw in the liquid from within the cylindrical tank in the form of filtrate through slits formed in a plurality of horizontal stages in the outer peripheral wall of the filtration tank and discharge the filtrate out of the cylindrical tank (second conventional technique).

Further, a coagulation reaction tank using a cylindrical tank and causing the liquid within the tank to be taken out in the form of filtrate from the upper part of the tank wall is disclosed in Japanese Utility Model Public Disclosure SHO 61(1986)-810 and SHO 61(1986)-811 (third conventional technique).

The conventional techniques are invariably capable of discharging filtrate containing substantially no floc from within a filtration tank and releasing floc of ample strength from a cylindrical tank. In the case of the first conventional technique, since the bottom of the filtration tank is formed with a punched plate or a netting, minute particles of the floc or minute fibrous particles entrained by the sludge clog the holes in the punched plate or the meshes of the netting.

As a solution, therefore, the rotary vanes of the stirring means are provided with a wiper such as brushes or rubber plates adapted to be rotated and rubbed against the upper and lower surfaces of the bottom of the filtration tank so as to sweep the bottom of the filtration tank. The wiper, however, fails to manifest a fully satisfactory cleaning effect because the fibrous particles entangle on the brushes or rubber plates. In the case of the second conventional technique, the minute particles of floc or the minute fibrous particles entrained by the sludge clog the multiplicity of horizontal slits in the outer peripheral wall of the filtration tank.

As a solution, the rotary shaft of the stirring means is provided with brushes attached radially thereto and adapted to rub the inner surface of aforementioned outer peripheral wall and prevent the slits from the clogging. The brushes, however, fail to manifest fully satisfactory cleaning effect because the fibrous particles entangle on the brushes In the case of the third conventional technique, since vertical slits are formed in the tank wall, the fibrous particles in the sludge catch in the slits As a solution, a rotating brush is brought into contact with the slits from outside the tank to clean the slits. The rotary brush, however, fails to manifest a fully satisfactory cleaning effect because the fibrous particles similarly entangle on the brush.

DISCLOSURE OF THE INVENTION

The present invention is characterized by the fact that the aforementioned filtration tank is disposed inside the cylindrical tank in such a manner that the bottom thereof falls above the region of rotation of the stirring vanes, the slits for drawing in the liquid from within the cylindrical tank in the form of filtrate are formed in the bottom of the filtration tank in arcuate shapes concentrical with the cylindrical tank, and the upper edges of the stirring vanes are juxtaposed to the lower surface of the bottom of the filtration tank.

The present invention is further characterized by the fact that the filtration tank is disposed outside the upper outer periphery of the wall of the cylindrical tank, the slits for introducing the liquid from within the cylindrical tank in the form of filtrate into the filtration tank are formed horizontally in the upper part of the wall of the cylindrical tank enclosed with the filtration tank, and the outer edges of the stirring vanes are juxtaposed to the upper inner surface of the wall of the cylindrical tank.

BEST MODE FOR CARRYING OUT THE INVENTION

Now, the present invention will be described with reference to the drawings.

In each of the illustrated embodiments, 1 stands for a cylindrical tank, 2 rotary agitating means disposed upright in the central part of the tank 1 mentioned above and driven rotationally by a motor and a transmission, 3 and 4 for a sludge feed pipe and a chemical feed pipe for supplying sludge and a coagulant to the bottom part of the tank, and 5 for a sludge discharge pipe for discharging coagulated floc.

To a rotary shaft 2' of the rotary stirring means, stirring vanes 6a, 6b are attached in two vertical levels radially at angular intervals of 180°.

Figure 1:
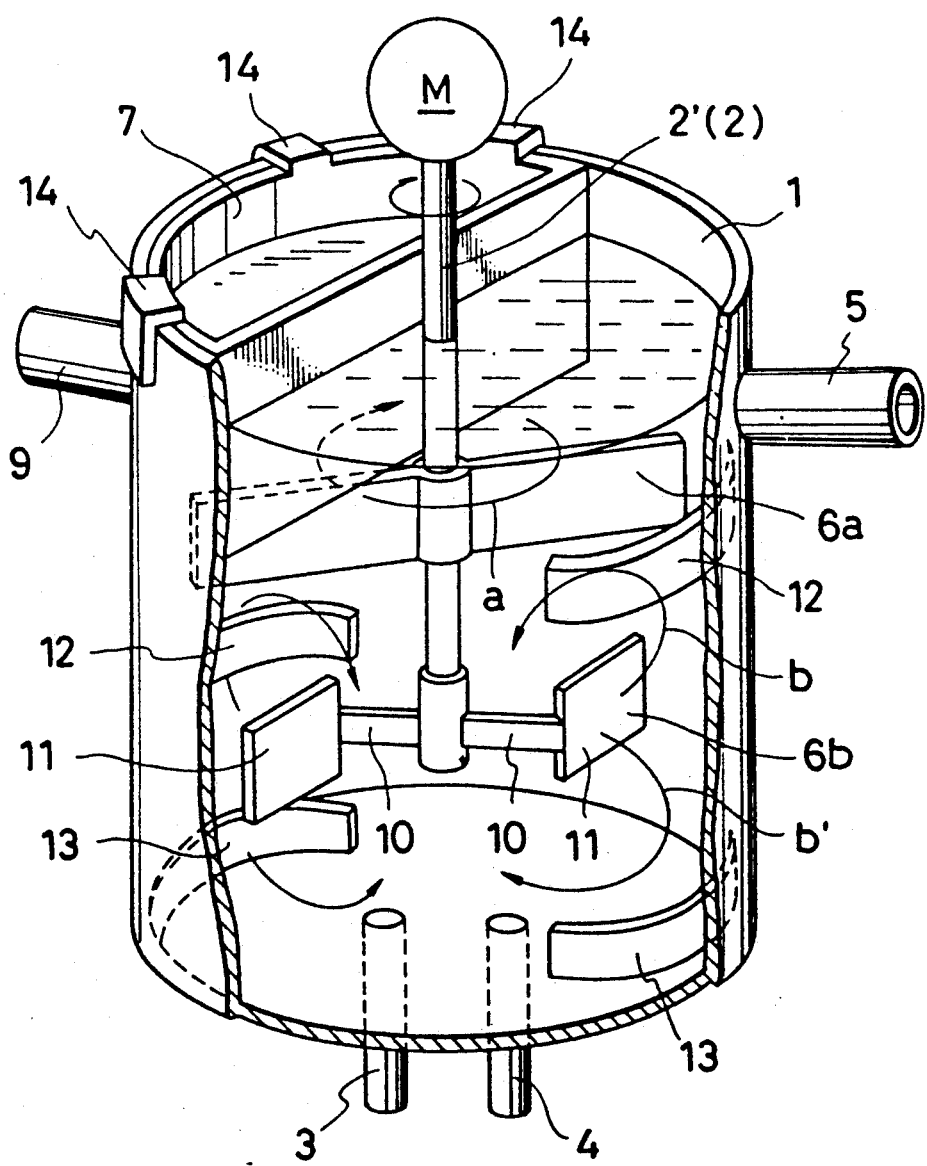
FIG. 1 is a perspective view illustrating a typical coagulation reaction tank as one embodiment of the first aspect of this invention, with part of a cylindrical tank cut away.
Figure 2:
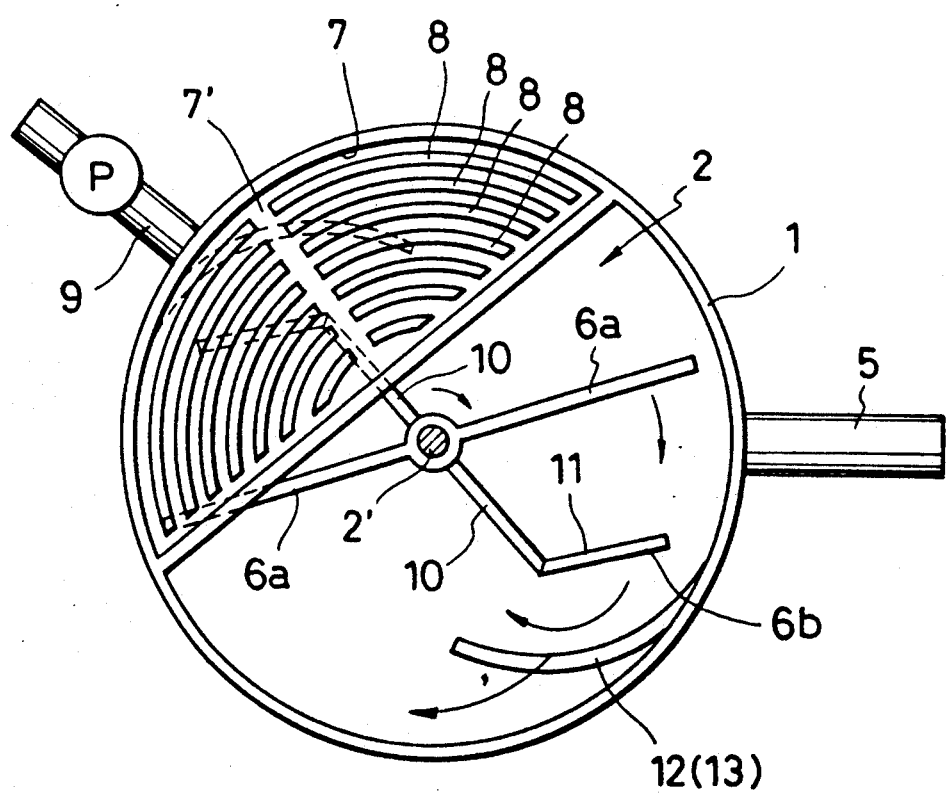
FIG. 2 is a plan view of FIG. 1.

FIG. 1 and FIG. 2 represent one embodiment of the present invention. Along the inner wall of the cylindrical tank 1, a filtration tank 7 is disposed which has a cross section slightly smaller than a semicircle and a curvature identical with that of the inner wall of the cylindrical tank 1. The upper end of the filtration tank 7 is flush with the upper end of the cylindrical tank 1 and the bottom 7' of the filtration tank 7 is so near to the upper edges of the stirring vanes 6a in the upper level as to be separated only by a distance of about 5 to 20 mm therefrom. In the bottom 7', a multiplicity of arcuate slits 8 are disposed in circularly parallel rows concentrically with the cylindrical tank 1. These slits 8 have a width of not more than 5 mm, preferably in the range of about 1 to 2 mm as radially separated by intervals of about 5 mm. The slits are circumferentially separated by intervals of about 2 mm. In the present embodiment, a discharge pipe 9 is laid through the wall of the cylindrical tank 1 so as to release the filtrate from the filtration tank 7.

The sludge and the coagulant supplied respectively through the sludge feed pipe 3 and the chemical feed pipe 4 to the central part of the bottom of the cylindrical tank, during their retention within the tank, are homogeneously mixed and allowed to react with each other by the stirring action of the stirring vanes 6a, 6b of the rotary stirring means 2. The water which enters the interior of the filtration tank 7 through the slits in the bottom is discharged as by a pump out of the tank through a discharge pipe 9. As a result, the sludge continuously supplied is amply concentrated and discharged in the form of floc of high strength through the sludge discharge pipe 5 and thence forwarded to, for example, a dehydrator.

The stirring vanes 6a in the upper level are rotated to generate a horizontal rotational current immediately below the bottom 7' of the filtration tank 7. Since the slits 8 formed in the bottom of the filtration tank have arcuate shapes concentrical with the rotational current and the minute particles of floc and the minute fibrous particles flow in the same direction as the slits under the bottom 7', the particles in motion are not entangled in the slits and, at the same time, the floc continues to roll under the bottom and consequently gain gradually in density and strength.

The stirring vanes 6a in the upper level are flat plates having a uniform vertical width throughout the entire length from the basal part fixed to the rotary shaft 2' to the leading end as illustrated in the diagram. The stirring vanes 6b in the lower level are desired to be formed each in the shape of a paddle consisting of a basal part 10 attached to the rotary shaft 2' and having roughly one half of the entire length and a smaller vertical width and a free end part 11 having the remainder of length and a larger vertical width. The reason for this construction is that the paddle-shaped stirring vanes push the water outwardly with their free end parts 11 of large width under the horizontally rotational current a generated by the stirring vanes in the upper level, the current of the outwardly pushed water is rotated and is divided near the inner wall of the cylindrical tank into an ascending current b and a descending current b', the ascending current b comes into contact with the horizontally circulated current generated by the flat-plate stirring vanes in the upper level and consequently decends in the direction of the central part, the descending current b' ascends in the central part along the bottom surface and, as a result, upper and lower rotationally circulated currents are generated in the central part and the bottom part of the cylindrical tank, and the sludge and the coagulant supplied to the central part of the bottom of the tank are allowed to ride on the currents b, b' and efficiently brought into mixing contact with the floc already formed and enhance the coagulation. When the free end parts 11 of a larger width are bent backwardly relative to the direction of rotation of the vanes as illustrated in the diagram (as with an angle of 45°), the force with which the free end parts push the water toward the inner wall of the tank is increased and, as a result, the rotational circulating current acquires greater strength and the efficiency of mixing and contact is enhanced. When guide plates 12 and 13 which are either straight or curved as illustrated and extended in the direction of rotation of the stirring vanes and gradually separated from the inner wall toward the leading ends thereof are disposed in the lower end part of the inner wall of the cylindrical tank and in the intermediate part between the stirring vanes 6a in the upper level and the stirring vanes in the lower level, the upper circulating current b which flows along the underside of the horizontally circulating current and then descends in the central part and the lower circulating current b' which flows along the tank bottom and then ascends in the central part are accelerated similarly to enhance the efficiency of mixing and contact.

In a circular tank constructed as illustrated in FIG. 1 and FIG. 2 and having an available inner volume of 100 liters (about 50 cm in diameter and about 70 cm in height), sludge (pH 5.1, TS (%) 1.42, VTS (%/TS) 64.4, SS (%) 1.21, VSS (%/SS) 65.44, fiber content 10.3, T-P (mg/liter) 228.0, supernatant $PO_4$-P (mg/liter) 44.2) was continuously supplied in combination with a coagulant and subjected to coagulation and concentration. Consequently, a dense and strong floc of particles 10 to 20 mm in diameter was obtained through the sludge discharge pipe 5.

In the operation of the cylindrical tank, the revolution number of the rotary shaft was 40 rpm, the length of the flat-plate stirring vanes 6a in the upper level was 20 cm and the vertical width thereof was 8 cm, the length of the basal part 10 of the paddle-shaped stirring vanes 6b in the lower level was 10 cm and the vertical width thereof was 4 cm, the length of the free end part 11 was 10 cm and the vertical width thereof was 12 cm, the peripheral speed of the leading end of the stirring vanes in both levels was 50 m/minute, the retention time of the sludge was 10 minutes, the horizontal cross-sectional area of the filtration tank was 25.6% of the horizontal cross-sectional area of the tank, the surface area of the opening in the arcuate slits in the bottom of the filtration tank was 28.6% of the horizontal cross-sectional area of the filtration tank, the depth of immersion of the filtration tank was 5 cm below the water level, the distance between the flat-plate stirring vanes in the upper level and the bottom of the filtration tank was 1 cm, and the width of the arcuate slits was 2 mm. During the operation, the arcuate slits in the bottom of the filtration tank were not at all clogged and were not entangled by fibrous particles.

The filtration tank 7 may be installed as a stationary device inside the cylindrical tank 1 and the filtered water entering the filtration tank through the arcuate slits 8 in the bottom may be discharged with a pump through the discharge pipe 9 laid through the wall of the cylindrical tank. The filtration tank 7 may otherwise be made of stainless steel separately of the cylindrical tank 1 and it may be suspended inside the cylindrical tank with the aid of suspending metal pieces 14 joined to the arcuate part thereof and suspended from the edge of the cylindrical tank. In this case, the liquid which enters the filtration tank may be discharged by a siphon.

Figure 3:
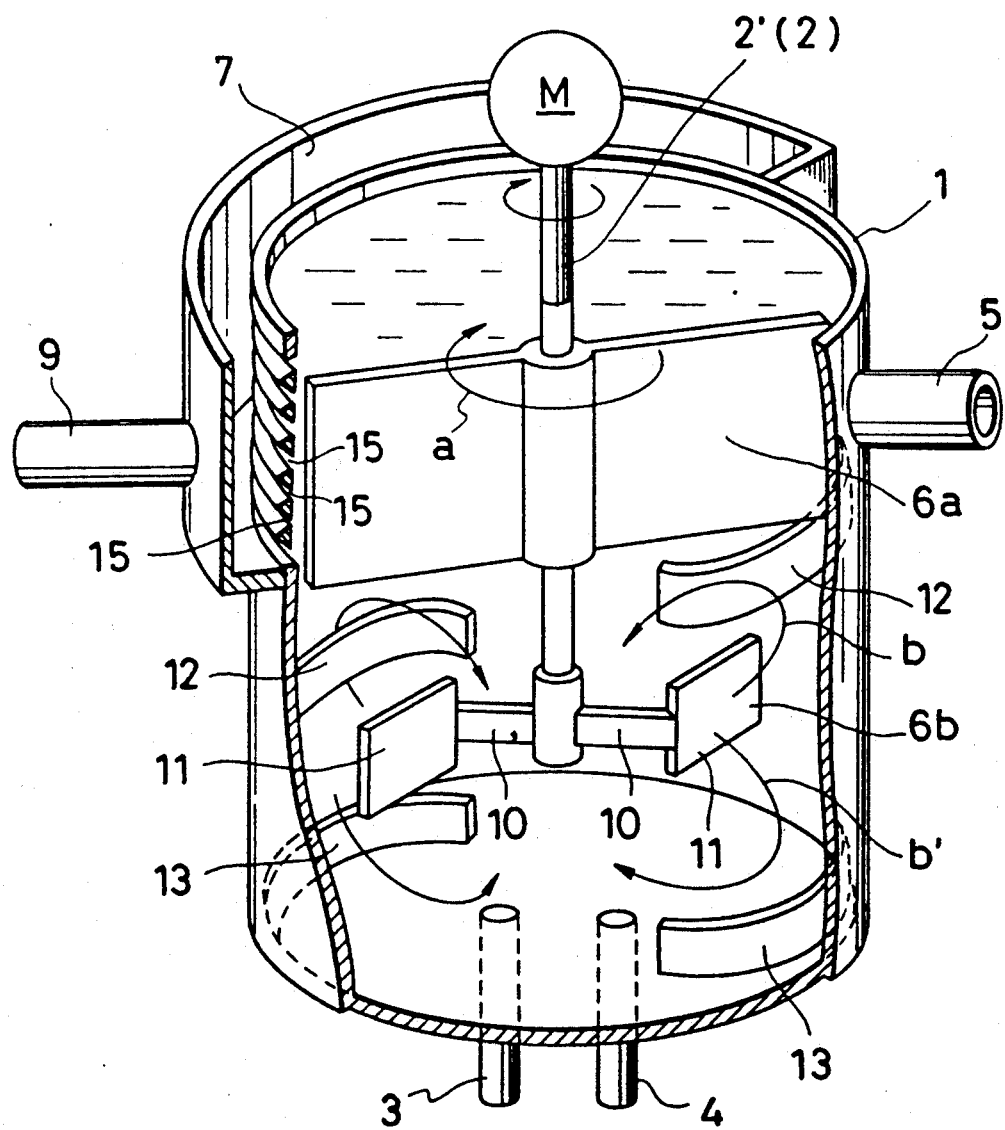
FIG. 3 is a perspective view illustrating a typical coagulation reaction tank as a further embodiment of this invention, with part of a cylindrical tank cut away.
Figure 4:
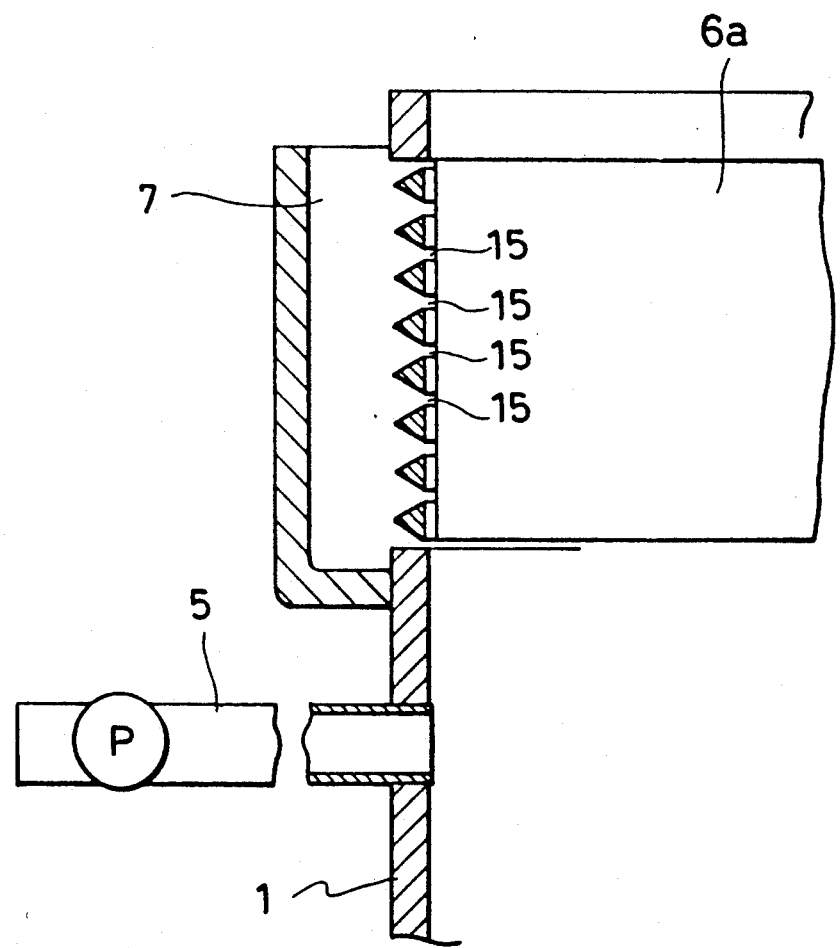
FIG. 4 is a magnified side view of the essential part.

FIG. 3 and FIG. 4 represent a coagulation reaction tank as a further embodiment of the present invention.

The present coagulation reaction tank differs from that of the embodiment of FIG. 1 and FIG. 2 in respect that the filtration tank 7 is disposed outside the upper outer periphery of the cylindrical tank 1 and horizontal slits 15 are disposed in a plurality of vertical stages in the upper part of the wall of the cylindrical tank 1 enclosed with the filtration tank 7, preferably in the region of rotation of the stirring vanes 6a in the upper level. Owing to this construction, the upper edge of the stirring vanes 6a in the upper level falls directly below the water level in the cylindrical tank 1.

In the present embodiment, the filtration tank 7 is laid throughout substantially one half of the circumference of the cylindrical tank outside the upper outer periphery of the wall of the cylindrical tank. Of course, it may be laid throughout the entire circumference of the cylindrical tank so as to enclose the cylindrical tank therewith.

The outer edges or the free edges of the stirring vanes 6a are approximated so much to the inner surface of the wall of the cylindrical tank containing the slits 15 as to be separated therefrom by a distance of about 5 to 20 mm. The outer edges may be covered with a rubber plate, when necessary, so that the rubber plates will rub the inner surface of the wall of the cylindrical tank while the stirring vanes are in rotation.

The vertical width of the slits 15 is not more than 5 mm and preferably in the range of 1 to 2 mm. The vertical distance between the slits in the upper stage and those in the lower stage is about 5 mm.

In the present embodiment, the sludge and the coagulant supplied to the central part of the bottom inside the cylindrical tank through the sludge feed pipe 3 and the chemical feed pipe 4, during their retention inside the tank, are homogeneously mixed and caused to react with each other by the stirring action of the stirring vanes 6a, 6b of the rotary stirring means. The water which enters the interior of the filtration tank 7 through the slits 15 in the tank wall is discharged out of the tank through the discharge pipe 9 by means of a pump. Consequently, the sludge continuously supplied is thoroughly concentrated to give rise to floc of high strength. This floc is discharged through the sludge discharge pipe 5 and then forwarded to, for example, a dehydrating device.

The stirring vanes 6a in the upper level are horizontally rotated closely to the upper inner surface of the wall of the cylindrical tank containing the slits 15. The floc produced inside the cylindrical tank is pushed by the stirring vanes 6a and caused to roll on the inner surface of the wall along the slits 15. Thus, the floc is incapable of clogging the slits. Moreover, the floc gradually gains in density and strength by being rolled on the inner surface of the wall along the slits.

Instead of causing the water which flows into the filtration tank 7 through the slits 15 to be discharged through the discharge pipe 9 by means of a pump, the water may be discharged by controlling the flow volume of the water by V notches formed in the trough attached to the exterior of the filtration tank. The level in which the sludge discharge pipe 5 is laid relative to the cylindrical tank 1 may fall where the slits 15 are located in the cylindrical tank. Otherwise, this level may be below the region of rotation of the stirring vanes in the upper level as illustrated in FIG. 4.

In either of the embodiments, the sludge and the coagulant have been described as being supplied separately of each other to the central part of the bottom of the tank interior. Optionally, the sludge may be mixed with the coagulant prior to supply to the tank and then supplied in the state mixed with coagulant to the central part of the bottom of the tank interior.

INDUSTRIAL APPLICABILITY

The present invention, by forming the slits 8, 15 for passage of water from the cylindrical tank to the filtration tank in a direction coinciding with the direction in which the current of water generated within the cylindrical tank by the stirring vanes and enabling the formed floc to be driven forward with the stirring vanes near the slits, enables the coagulation reaction tank to be operated safely without requiring use of brushes or scrapers, effects coagulation and concentration of the sludge without entailing the problem of clogging, and produces dense and strong floc. Particularly when the coagulation reaction tank is used for dephosphorized biosludge, it is capable of sequestering phosphorus and treating the sludge without suffering release of phosphorus on the liquid side.

We claim:
1. A coagulation reaction tank comprising:
   a cylindrical tank;
   rotary stirring means comprising a rotary shaft positioned in a central part of said cylindrical tank, an upper stirring vane forming a flat plate having a uniform vertical width and mounted on said rotary shaft so that a distance of about 5 to 20 mm is defined between an outer edge of said upper stirring vane and an inner wall of said cylindrical tank, and a lower stirring vane mounted on said rotary shaft and having a base part defining a first vertical width and a free end part defining a second vertical width which is larger than said first vertical width, said rotary stirring means stirring sludge and a coagulant located within said cylindrical tank and converting the sludge into floc;
   a filtration tank mounted outside an upper outer peripheral wall of said cylindrical tank, said upper outer peripheral wall of said cylindrical tank comprising a plurality of slits having a vertical width of not more than 5 mm for admitting liquid from within said cylindrical tank in the form of filtrate and discharging said filtrate out of said cylindrical tank; and
   guide plates disposed above and below said lower stirring vane within the cylindrical tank for enhancing the stirring efficiency.

* * * * *